Aug. 26, 1947.    S. G. TILDEN ET AL    2,426,421
FRICTION ELEMENT ASSEMBLY
Filed May 2, 1942
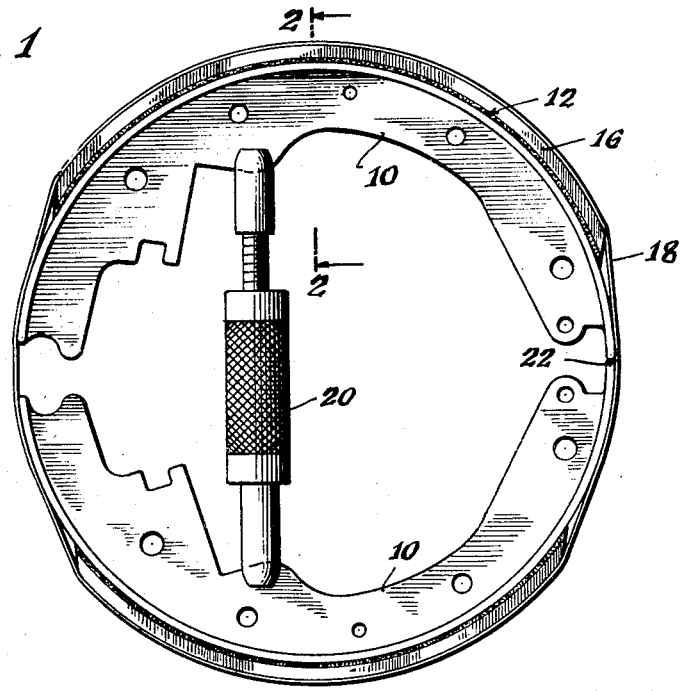
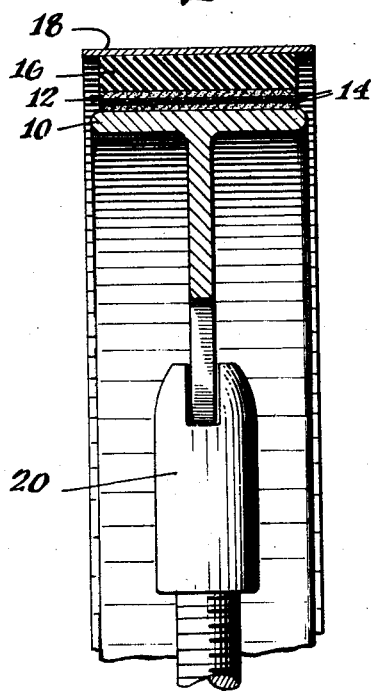
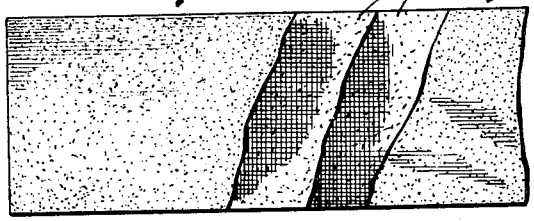
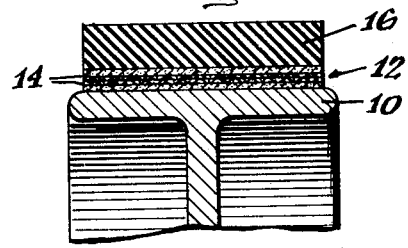
INVENTORS
SIDNEY G. TILDEN
FOSTER D. SNELL
BY JACOB M. FAIN
Robert Calvert
ATTORNEY Patented Aug. 26, 1947

2,426,421

UNITED STATES PATENT OFFICE 2,426,421

FRICTION ELEMENT ASSEMBLY

Sydney G. Tilden, Stewart Manor, Foster Dee Snell, New York, and Jacob M. Fain, Belle Harbor, N. Y., assignors to Foster D. Snell Inc., Brooklyn, N. Y., a corporation of New York Application May 2, 1942, Serial No. 441,508

3 Claims. (Cl. 154—46)

1

This invention relates to a friction element assembly, a sheet binder material for use therein, and the method of making the same.

The invention is particularly useful in securing automobile brake lining to brake shoes and will be illustrated by detailed description in connection with such use.

The objection to the use of rivets in securing brake lining to brake shoes is of long standing. It is generally recognized that, when the lining is worn down to about half or slightly less of the original thickness, then the rivets introduce the hazard of scoring the brake drums, so that new lining should be installed. Furthermore, the use of such rivets requires drilling of the lining material and countersinking the rivet heads. The materials of which such rivets are made, to minimize the possible scoring of the brake drums, are relatively expensive.

Many attempts have been made to avoid the use of rivets, yet there has been developed so far no wholly satisfactory and widely accepted method of securing the brake lining to the shoe without the use of rivets or a multi-ply binding composite.

The present invention provides a method and product that solves this problem of long standing.

Briefly stated, the invention comprises the method of and the assembly resulting from placing upon the appropriate surface of the brake shoe one or more continuous integral sheets of a resin binder material adapted to be set by heating to a firm but slightly and resiliently yieldable binder, disposing over the exposed surface of the binder a preformed friction element such as conventional brake lining, pressing the assembly so as to establish conformance and pressure contact between the resin layer and the brake shoe on one side and between the resin layer and brake lining on the other, and then heating the assembly while under pressure to cause thermosetting of the resin, the resin binder including a skeletonizing fabric extending throughout the binder and the resin binder extending completely through the fabric so as to constitute both the face and back of the binder layer as used and the said face and back in turn being joined together at close intervals by masses of such composition extending through the fabric, so that the binder forms an integral mass. The invention comprises also the sheet binder material in condition for introduction into the said assembly.

The invention will be illustrated by detailed description in connection with the attached drawing to which reference is made.

2

Fig. 1 is a side view of the assembly ready for heating to cause setting of the binder layer.

Fig. 2 is a cross-section on line 2—2 of Fig. 1.

Fig. 3 is a plan view of the binder sheet partly broken away for clearness of illustration.

Fig. 4 is a section of the finished assembly.

In the various figures the thickness of the binder layer and friction element are somewhat exaggerated as compared to other dimensions or other parts of the whole assembly.

There are shown brake shoes 10 with face and web portions, a layer of binder material 12 including one or more sheets of a skeletonizing fabric 14, and friction elements 16.

At the time of heating the assembly to cause setting of the resin, the whole assembly is confined by a hoop 18 or other suitable retaining member and the various parts of the assembly are pressed together, as by means of the hand jack 20 which forces the brake shoes outwardly around a pivot line 22 on which two shoes abut.

As the brake shoes, there are used the metal supports of any conventional type now in use. The kind shown are those that are designed for internal expanding brakes.

As the friction elements, there are used segments cut as used from continuous rolls or preformed segments, either type being entirely satisfactory insofar as our process for attachment is concerned. Thus there may be used brake lining formed by weaving a brass-wire reinforced asbestos yarn into a tape which is then impregnated with a hardenable compound of rubber, bituminous asphalt or phenolic resin, such linings being known to the trade as woven linings; brake linings formed by impregnating asbestos millboard with hardenable friction compound; brake linings formed by extrusion of a plastic mixture of asbestos, rubber, bituminous asphalt and/or phenolic resin; or brake linings formed by compressing dry mixtures of the same, the latter three types being known as molded linings. The natural rubber in such compounds may be replaced in whole or more often in part by synthetic rubber, synthetic rubber-like materials, factice, or other similar material.

As the binder material which secures the brake lining to the shoe, there is used a thermosetting resin composition adapted after setting to be firm yet slightly and resiliently yieldable and containing a fabric skeletonizing member extending throughout the composition without destroying the integrality of the resinous binder material.

Resin compositions that are typical of those that meet the general requirements are resinous condensation products of melamine with formaldehyde, phenol with formaldehyde, and urea with formaldehyde, all in unset condition. For best results, the resin is mixed with a substantially non-volatile non-hardening softener or solvent that is adapted to remain a permanent plasticizer for the resin after setting.

Plasticizers that are illustrative of the class that may be used as softeners are a mixture of ortho- and paratoluene sulfonamide (Santicizer 9 being a commercial variety of such material), tricresyl phosphate, and a somewhat plastic non-drying liquid resin as, for example, an alkyd resin made with phthalic anhydride, glycerin and a non-drying fatty oil acid.

The plasticizer selected for a given resin should be one that is known to have the general properties stated and to be a solvent for or miscible with the selected resin according to the data that is readily available from the manufacturers.

Particularly satisfactory results are obtained when the resin composition includes also a special type of surface-tension lowering agent containing at least 8 carbon atoms in a non-polar group that is soluble in both the resin binder material and the friction compound of the friction element; as, for example, a quaternary ammonium salt such as oleyl trimethyl ammonium chloride or lauryl pyridinium chloride, a polyethylene oxide compound which will preferably contain a non-polar group such as octadecyl, oleyl, or lauryl substituted for a hydrogen particularly if not of very large molecular weight, and the octyl or similar diester of sodium sulfosuccinate.

Various proportions of the several ingredients in the binder material may be used. In any case the proportion of the surface-tension lowering agent is low, usually about 0.2 to 2% by weight of the total and suitably about 1%. The proportion of the plasticizer to the resin should be adjusted in accordance with the hardness of the resin alone and the effectiveness of the plasticizer as a softening agent per unit of proportion used. With the resins and plasticizers given for illustration, satisfactory proportions are about 15 to 60 parts of the plasticizer for 100 parts by weight of the total resin and plasticizer combined, approximately equal proportions of the plasticizer and resin being satisfactory when the plasticizer itself is a stiff plastic or low melting solid. When, on the other hand, the plasticizer is itself a liquid and a relatively effective solvent for the resin, then the proportion of plasticizer should be of the order of 20% or so of the total resin composition. Thus, we have used to advantage approximately equal weights of a solid tetraalkyl amine plasticizer and melamine and formaldehyde resin, but only 20 parts of tricresyl phosphate (a liquid) as plasticizer for 100 parts of total weight of phenol and formaldehyde resin and plasticizer composition. With commercial melamine-formaldehyde resins we have used mixed ortho- and paratoluene sulfonamides under the commercial name of "Plasticizer 120" in the ratio to resin of 35:65. With an oil-modified alkyd resin as the plasticizer we have found proportions of 30 parts of plasticizer to 70 parts of resin satisfactory when the resin is melamine-formaldehyde.

As the skeletonizing agent for the binder material, there is used a woven fabric having meshes through which the plastic composition comes to extend as a continuous mass. Thus, we have used to advantage cheesecloth, rayon, silk or wool textile having open meshes adapted to permit the continuous extension of the resin composition through the textile. Cheesecloth is particularly satisfactory as it is relatively open in its mesh, thin, flexible and inexpensive. Since this is a skeletonizing agent only, so much body or weight is desirable as will be required to serve as a carrier to maintain continuity of the resin film during formation and handling. Very light sheets of skeletonizing material are found satisfactory in making very thin sheets of resin. In such a case, a multiplicity of sheets of the skeletonized resin may be used. A thicker skeletonizing material with a corresponding greater thickness of resin film is an alternative, with a lesser number of sheets or even only a single sheet being used. A multiplicity of thin sheets has some advantage in that they are more flexible and can therefore be shaped more readily and handled more roughly without breakage.

In making the sheet of binding material, the selected fabric, either in wide sheets or in the form of narrow strips of about the width desired in the finished braking assembly, is passed through the resin composition in liquid form, the liquid form being obtained by use when necessary of a volatile solvent for the several ingredients of the resin composition and in proportion to give dilution to the desired viscosity and concentration. Thus we may dissolve the selected resin compositions in a known solvent for the resin and plasticizer present in amount to give a liquid of syrupy consistency. In the case of melamine resins or the urea formaldehyde resins, water may be used as the solvent. For the former, the addition of 25 percent of alcohol to the water is advantageous but not essential. In the case of the phenol formaldehyde resins in incompletely condensed form, the solvent is selected according to the proportions and degree of polymerization of the resin. The solvent we usually select is alcohol but as alternative solvents we may use a ketone, as, for example, acetone or ethyl methyl ketone or a mixture of ketones with each other or with limited proportions of volatile esters and hydrocarbons.

After the fabric has been immersed and substantially saturated with the liquid form of the resin composition, the fabric and adhering composition are withdrawn from the impregnating bath, straightened somewhat, and then subjected to a moderately elevated temperature, or to ordinary temperatures if speed of operation is not important, to cause evaporation of volatile solvent present without setting the resin composition. Thus the fabric and adhering solution may be subjected to a temperature of about 60 to 100° C. for the minimum period required to evaporate practically all of the volatile solvent present and give to the product a weight that remains nearly constant during a period of a few minutes' additional heating at the selected temperature. Half an hour or so is usually about the period of time necessary for this evaporation. While this heating continues for a brief period after the solvent is evaporated the temperature is sufficiently low with respect to the usual temperature for polymerization of the resin so that little or no polymerization is believed to occur during this thorough drying out.

We have found it desirable for best results to use a plurality of sheets of thin open-mesh fabric material for immersion in the resin solution and to dry as described. Thus, we have used to advantage in a process of the kind described a double thickness of cheesecloth, to give a dried product in which a double thickness of the fabric is embedded in an integral relatively thick layer of the binder material. A similar result is obtainable by preparation of single layers of which a plurality are used in combination.

The layer of binder material so formed is then ready for use. It is placed upon the clean surface of the brake shoe which ordinarily receives a brake lining. Then the brake lining is carefully laid in proper position over the layer of binder material. While the several parts are held in approximately the positions with respect to each other that is necessary in the finished assembly and illustrated in Figs. 1, 2, and 4, the retaining hoop is installed around the assembly and the brake shoes moved apart to tighten the assembly. The hand jack is used finally, to put the whole under pressure so that there is the desired conformance and pressure contact between the brake lining, intermediate binder layer, and the brake shoes.

The assembly thus made and illustrated in Figs. 1 and 2 is then transferred to a curing oven maintained at a sufficiently elevated temperature to cause thermosetting of the resin in the binder layer. This temperature is that which is usual in giving a firm and moderately hard product from the resin present in the composition. Thus the temperature may be approximately 325° to 400° F. and to advantage about 350° to 375° F. During this heating and pressing, the resin fuses, conforms to the irregularities in the brake shoe and brake band, which are inherent in commercial manufacture of such shapes, and fills in the space between members 10 and 16 without leaving air voids or unattached areas. In so setting the resin is a continuous film. While the skeletonizing material remains embedded in it, the resin so permeates the threads of it that the resin constitutes a continuous mass.

Variations of proportions may be made within the range of adequate strengths. Thus, the amount of skeletonizing material may be increased as a matter of economy to such extent as will not destroy the continuity of the resin and film or weaken the film.

Various meshes of the textile to be impregnated may be used, so long as the fabric has reasonable body before impregnation and meshes permitting penetration of the resin completely through them during impregnation. Thus there may be used fabrics of about 15 to 100 meshes to the linear inch, fabric of 20 to 60 mesh being preferable.

After heating to the satisfactory temperature for setting the particular resin used and for usual setting time, say, half an hour or so at the temperature stated, the assembly is removed from the heating oven and allowed to cool, the pressure on the assembly is released, and the jack and the hoop are removed from the assembly.

In the assembly so made it is found that the resin binder composition remains permanently slightly and resiliently yieldable although firm, so that there is the desired firmness of bonding of the brake lining to the brake shoe. At the same time, the binding material is appreciably yieldable, so that separation of the binder layer from the elements to which it is joined is prevented, even under the normal flexing of the brake shoe in service and when the assembly is subjected to sudden shock such as that due to the sudden change of temperature, to severe use in stopping a car quickly, to the use of tools while being installed, or the sharp shock resulting if the assembly is inadvertently dropped on a hard surface such as a concrete floor. Furthermore, there is a thin but appreciable zone of blending between the binder layer and the compound of the friction element, so that the suddenness of change of properties of materials between the binder layer and the friction element is eliminated. The use of a surface-tension lowering agent of the kind described promotes this formation of a blended transition zone.

Unions so effected have been found to be characterized by an extremely strong bond. Thus bonds so made between strip metal and binder material have been found to withstand a lengthwise pull of approximately 2,400 to 3,000 pounds before separation when the binder material was adhered to the metal over an area of 4 square inches. Furthermore, the bond persists with satisfactory strength, although with somewhat decreased strength, after exposure of the bond to temperatures approximating those produced in a brake lining by severe use.

Typical test data obtained are the following:

In comparing the strength of rivets to the strength of the fused bond made as described, we have found that, in the samples of rigid molded brake linings used, the rivet heads would pull through the brake lining before the rivet itself would shear, and we found that this occurred at an average of 400 pounds shear per rivet. The table appended hereto lists the number of brake lining rivets used on five different cars, together with the maximum shear strength based on 400 pounds per rivet. The table also shows the maximum possible shear on the brake lining based upon developing a retarding force equal to the weight of a 5 passenger sedan model with five 150 pound passengers, i. e., a deceleration rate of $g$. Factors of safety are shown based upon the relation between the total rivet shear strength and the maximum possible shear on the brake lining. Note that they vary from a minimum of 2.2 on the Dodge to a maximum of 5.0 on the Packard.

We have made many tests also to determine the strength of the fused bond. We have obtained a shear strength as high as 3,000 pounds over an area of 3.5 square inches, or a unit strength of 860 pounds per square inch. For the purpose of comparison, however, we have selected a unit shear strength of 600 pounds per square inch which we had no difficulty in obtaining if the proper material was used and procedure followed. The table appended shows the shear strength of the fused bond for the different cars on this basis and the factors of safety which vary from a minimum of 8.9 on the Buick to a maximum of 11.0 on the Ford. These factors are at least double and in some cases quadruple the factors of safety obtained with rivets.

Temperatures as high as 2,000° F. have been found at the point of contact between the brake lining and the brake drum but this is only a surface temperature which rapidly decreases beneath the surface in proportion to the depth. We have determined by experiment that the temperature of the brake shoe, except for this surface film, rarely if ever exceeds 500° F.

To determine the effect of such brake shoe temperature on the resin bond therefore many tests were made of samples of brake lining fused to the brake shoe, which samples were heated to 550° F. for 30 minutes subsequent to the polymerization treatment at 375° F. for 30 minutes. These samples showed unit shear strengths of 560 to 600 pounds per square inch. For this reason, the table appended showing shear strengths of fused bonds, is figured on the basis of 600 pounds per square inch shear strength rather than the 860 pounds per square inch shear strength obtained after polymerization at the lower temperatures.

atoms and the proportion of the plasticizer being approximately 15-70 parts for 100 parts of plasticizer and resinous condensation product.

2. A binder as described in claim 1, the said fabricated sheet being cheesecloth.

3. A product as described in claim 1, the said

*Comparison of safety factors, brake lining rivets vs. our resin bond*

| Car used in test | Buick | Chevrolet | Dodge | Ford | Packard |
|---|---|---|---|---|---|
| Weight of 4 door sedan with 5 passengers | 4,480 | 3,890 | 3,940 | 3,870 | 4,040 |
| Maximum shear on brake lining in pounds | 10,800 | 9,900 | 10,000 | 9,050 | 10,250 |
| Number of brake lining rivets | 128 | 80 | 56 | 72 | 128 |
| Shear strength at 400 lbs. per rivet | 51,200 | 32,000 | 22,400 | 28,800 | 51,200 |
| Factor of safety with riveted lining | 4.7 | 3.2 | 2.2 | 3.2 | 5.0 |
| Brake lining area in sq. in | 161 | 164 | 156 | 167 | 158 |
| Shear strength of fused bond at 600 lbs. sq. in | 96,600 | 98,400 | 93,600 | 100,200 | 94,800 |
| Factor of safety with fused lining | 8.9 | 9.9 | 9.4 | 11.0 | 9.2 |

It will be understood also that it is intended to cover all changes and modifications of the example of the invention herein chosen for the purpose of illustration which do not constitute departures from the spirit and scope of the invention.

What we claim is:

1. A binder for holding a friction-compound-containing brake lining to a brake shoe, the binder being a continuous resinous sheet including a thermosetting resinous condensation product that after setting is slightly and resiliently yieldable, a surface tension lowering agent, a plasticizer for the resinous condensation product distributed throughout the said product, and a thin fabricated non-resinous sheet disposed completely within the resinous sheet and between the face and back thereof and serving as a skeletonizing agent for the resinous sheet, the material of the resinous sheet extending completely through the skeletonizing agent, so that the face and back of the resinous sheet are integrally united, the surface tension lowering agent being an organic compound that is surface active, is soluble in the resinous condensation product and also in the said friction compound, and contains a non-polar group including at least 8 carbon fabricated sheet serving as skeletonizing agent being in the form of a plurality of plies.

SYDNEY G. TILDEN.
FOSTER DEE SNELL.
JACOB M. FAIN.

REFERENCES CITED

The following references are of record in the file of this patent:

UNITED STATES PATENTS

| Number | Name | Date |
|---|---|---|
| 2,272,532 | Shriver | Feb. 10, 1942 |
| 2,233,090 | Asnes | Feb. 25, 1941 |
| 2,009,207 | Rosner | July 23, 1935 |
| 2,077,017 | Schacht | Apr. 13, 1937 |
| 2,077,669 | Bruce | Apr. 20, 1937 |
| 2,087,453 | Steder | July 20, 1937 |
| 2,138,876 | Novak | Dec. 6, 1938 |
| 2,197,357 | Widmer et al. | Apr. 16, 1940 |
| 1,616,659 | Heany | Feb. 8, 1927 |
| 1,284,432 | O'Conor | Nov. 12, 1918 |
| 2,137,465 | Thackston | Nov. 22, 1938 |
| 2,255,901 | Schroy | Sept. 16, 1941 |
| 2,191,362 | Widmer et al. | Feb. 20, 1940 |

OTHER REFERENCES

Automotive Merchandising, June 1941, pp. 22-24 and 71.